United States Patent [19]

Heard

[11] Patent Number: 5,209,049
[45] Date of Patent: May 11, 1993

[54] ARTICULATED LAWN MOWER

[76] Inventor: Jimmy Heard, 1242 Placid Dr., Lake Placid, Fla. 33852

[21] Appl. No.: 783,317

[22] Filed: Oct. 28, 1991

[51] Int. Cl.⁵ .......................................... A01D 34/00
[52] U.S. Cl. .................................... 56/15.5; 56/15.6
[58] Field of Search ................ 56/15.1, 15.5, 15.6, 56/208-214

[56] References Cited

U.S. PATENT DOCUMENTS

| 4,903,470 | 2/1990 | Hemker et al. | 56/15.5 X |
| 4,916,889 | 4/1990 | Molstad | 56/15.6 X |
| 5,079,926 | 1/1992 | Nicol | 56/15.5 X |

Primary Examiner—Thuy M. Bui
Attorney, Agent, or Firm—Dominik, Stein, Saccocio, Reese, Colitz & Van Der Wall

[57] ABSTRACT

A lawn mower deck assembly having a pair of similarly shaped decks. Each of the decks has rotary cutting blades for cutting grass therebeneath. Furthermore, a pivotal shaft is used to couple the decks together at their adjacent edges. The mower has wheels located adjacent to the first end of each deck and a mounting bracket located at the second end of each deck. Finally, H-links having upper and lower ends pivotally coupled to a mounting bracket and the deck allow the deck to raise and lower adjacent to the pivot axis for cutting grass on an uneven terrain.

5 Claims, 4 Drawing Sheets

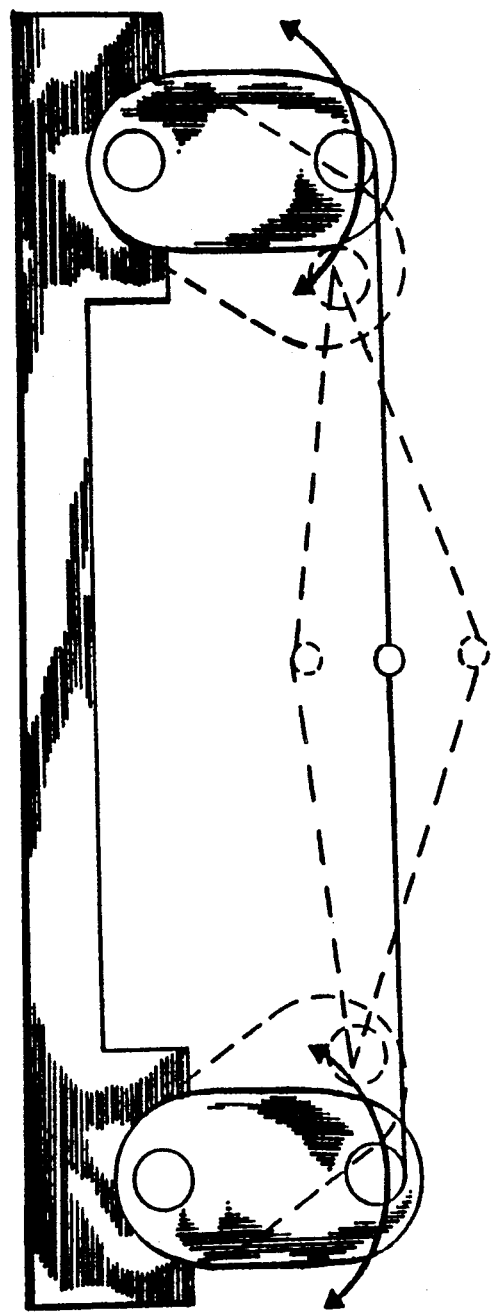
F I G. 5

ARTICULATED LAWN MOWER

BACKGROUND OF THE INVENTION

1. Field of the Invention

This invention relates to an articulated lawn mower and, more particularly, to a lawn mower with plural decks hinged together for the cutting of grass on an uneven terrain.

2. Description of the Background Art

In the field of lawn mowers, a rigid housing forms an inverted pan that surrounds a rotary blade. The blade is usually connected to a shaft, coupled to a power source. The power source is typically mounted to the rigid housing. Furthermore, the rigid housing serves as a chassis for mounting wheels thereto. The wheels of a conventional lawn mower roll over the terrain on which the grass is to be cut.

Because the housing is rigid, it is precluded from closely following the varying contours of the terrain to be mowed. The rigid housing must either span over valleys or contact raised ridges in the terrain to be mowed. Therefore, the rotary blade within the rigid housing is precluded from maintaining a uniform distance between the blade and the terrain to be mowed. This results in an uneven mowing.

The present invention overcomes the problems inherent in planar, rigid deck lawn mowers. The mower of the present invention utilizes two planar, rigid decks in a side by side configuration. The mower has a shaft that serves to pivotally couple the decks together about an axis in the direction of the mower movement.

Each deck has a rotary cutting blade secured beneath it and connected to a shaft extending upwardly to a motor. This arrangement allows the decks to more closely follow the contours of the terrain to be mowed. For example, when cutting grass within a ditch, the shaft and axis are lowered and the mower's decks are free to pivot with respect to each other about the pivotal shaft. The articulation allows the decks to conform to the terrain and thereby maintain a uniform distance between the rotary blades and the grass to be cut. When the decks are passed over hills, the shaft and axis are raised and the mower's decks can pivot to prevent the chassis from contacting the peak of the hill and thereby maintain a uniform distance between the rotary blades and the terrain. The mower of the present invention is able to follow the terrain's contours with a higher degree of precision than that of lawn mowers having rigid decks and thereby yields more uniform grass cutting resulting from the articulating decks.

The present invention is directed to improving known devices for cutting grass on uneven terrain by articulating the decks of a lawn mower in a manner which is safe, secure, convenient and economical.

Therefore, it is an object of this invention to provide an improved lawn mower deck assembly having a pair of similarly shaped decks. Each of the decks has rotary cutting disk and blades for cutting grass therebeneath. A pivotal shaft is used to couple the decks together at their adjacent edges. The mower has wheels located adjacent to the first end of each deck and a mounting bracket located at the second end of each deck. H-links having upper and lower ends pivotally coupled to a mounting bracket and the deck are utilized for allowing the decks to raise and lower adjacent to the pivot axis for cutting grass on an uneven terrain.

Another object of this invention is to articulate the decks of a lawn mower in a manner which is safe, secure and convenient to the manufacturer.

A further object of this invention is to manufacture articulating lawn mower decks economically.

A further object of this invention is to allow the rotary blades of a lawn mower to follow the contour of the terrain on which grass is to be cut.

Lastly, it is an object of the present invention to cut grass more evenly.

The foregoing has outlined some of the more pertinent objects of the invention. These objects should be construed as merely illustrative of some of the more prominent features and applications of the intended invention. Many other beneficial results can be obtained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the spirit and scope of the invention as defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an articulated lawn mower which includes an improved lawn mower deck assembly having a pair of similarly shaped decks. Each of the decks has a rotary cutting disk and blades for cutting grass therebeneath. A pivotal shaft is provided for coupling the decks together at their adjacent edges. The mower has wheels located adjacent to the first end of each deck and a mounting bracket located at the second end of each deck. H-links having upper and lower ends pivotally coupled to the mounting bracket and deck are utilized for allowing the decks to raise and lower adjacent to the pivot axis for cutting grass on an uneven terrain.

The articulated mower has wheel means at the first end of each deck comprising an interior wheel adjacent to the pivot axis and an exterior wheel remote therefrom. The exterior wheels have a generally cylindrically shaped profile. The mower further includes a limiting member comprising upstanding brackets coupled to the upper surface of each the decks and a rod hinged to one bracket and slideably secured to the other bracket with an element for limiting the degree of pivot.

The invention may also be incorporated into a lawn mower adapted to be coupled to a tractor for cutting the grass of an uneven terrain including a first deck having lateral edges at a front end and a rear end and a second deck having lateral edges at a front end and a rear end. The second deck is laterally positioned adjacent to the first deck at their adjacent lateral edges. The mower further includes a pivot means for coupling the adjacent lateral edges of the decks and is adapted to support the decks in side by side relationship to form an essentially horizontal plane. A rotary cutting means is secured to the lower surface of each of the decks. Furthermore, a motor is secured to each cutting means on the upper surface of each deck. An interior and exterior wheel are located adjacent to one end of each of the decks. The exterior wheels have a barrel shaped profile. An A-frame mounting bracket is coupled to the upper surface of each of the decks adjacent to the other end of each of the decks. Additionally, link means pivotally couple each deck and to a portion of the mounting bracket. Each link is freely swingable in a vertical plane parallel with the front and rear ends. When the interior wheels are lowered through the cutting in a valley the pivot means and adjacent edges of the decks will move downwardly and the lower portions of the links will swing inwardly toward the pivot means. Finally, a limiting means formed of an upstanding fixture is coupled to each deck. The limiting means is pinned at its first end to one bracket and slidable in the other fixture. The slidable connection has positionable means received in the second end of the rod to limit the degree of pivoting.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed herein may be readily utilized as a basis for modifying or designing the other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a more complete understanding of the nature, object and advantages of the present invention, reference should be had to the following detailed description taken in conjunction with the accompanying drawings in which:

FIG. 5 is a schematic illustration of the A-frame and H-links showing the range of motion of the H-links resulting from articulation of the decks.

Similar reference characters refer to similar parts throughout the several drawings.

DETAILED DESCRIPTION OF THE INVENTION

Figure 1:
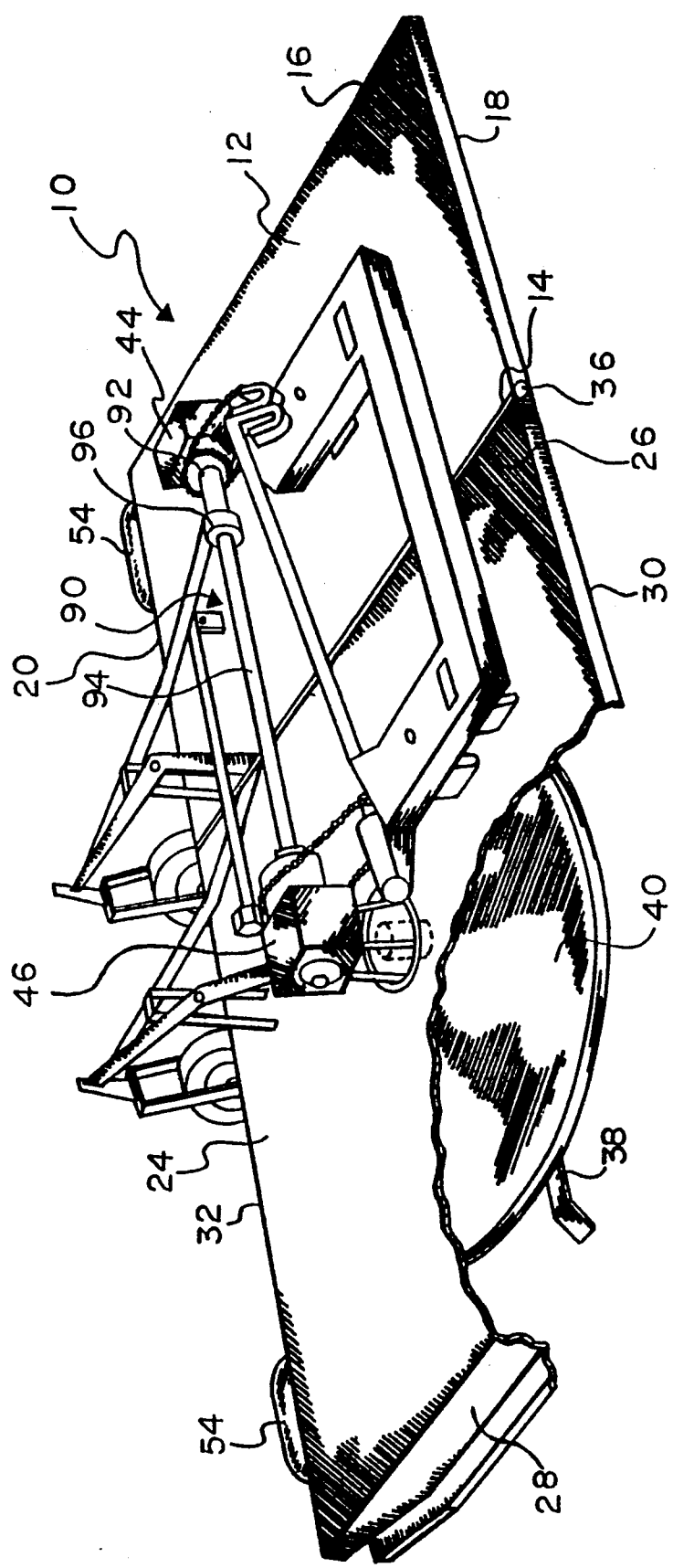
FIG. 1 is a perspective view of the present invention taken from one end thereof.
Figure 2:
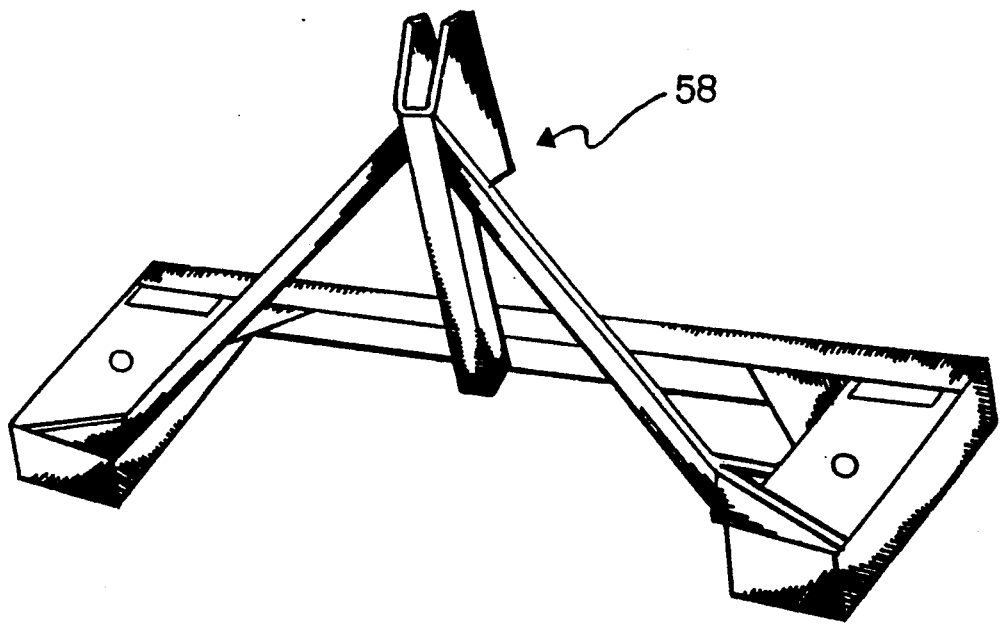
FIG. 2 is a perspective view of the A-frame bracket taken from the other end.
Figure 3:
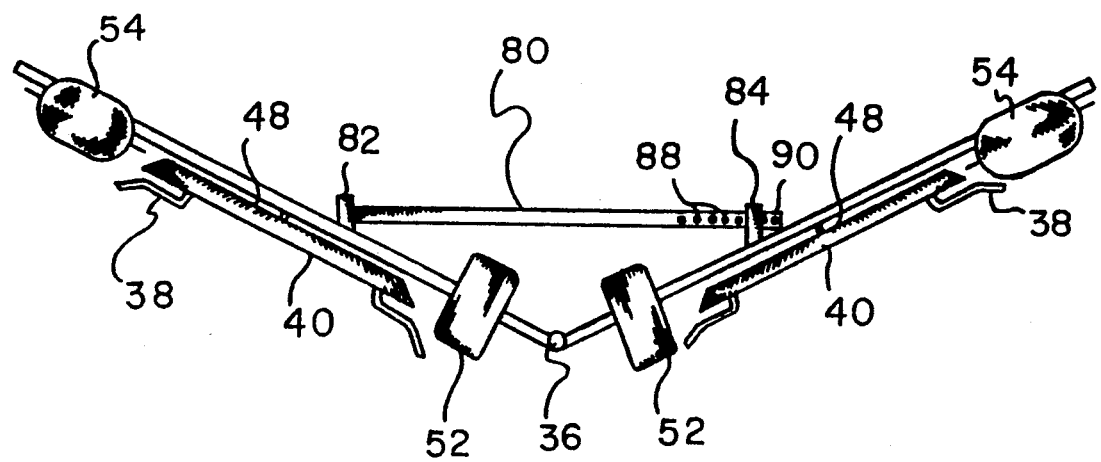
FIG. 3 is a cross sectional view of the articulated deck shown in FIG. 1 showing the rotary blades and pivot axis.
Figure 4:
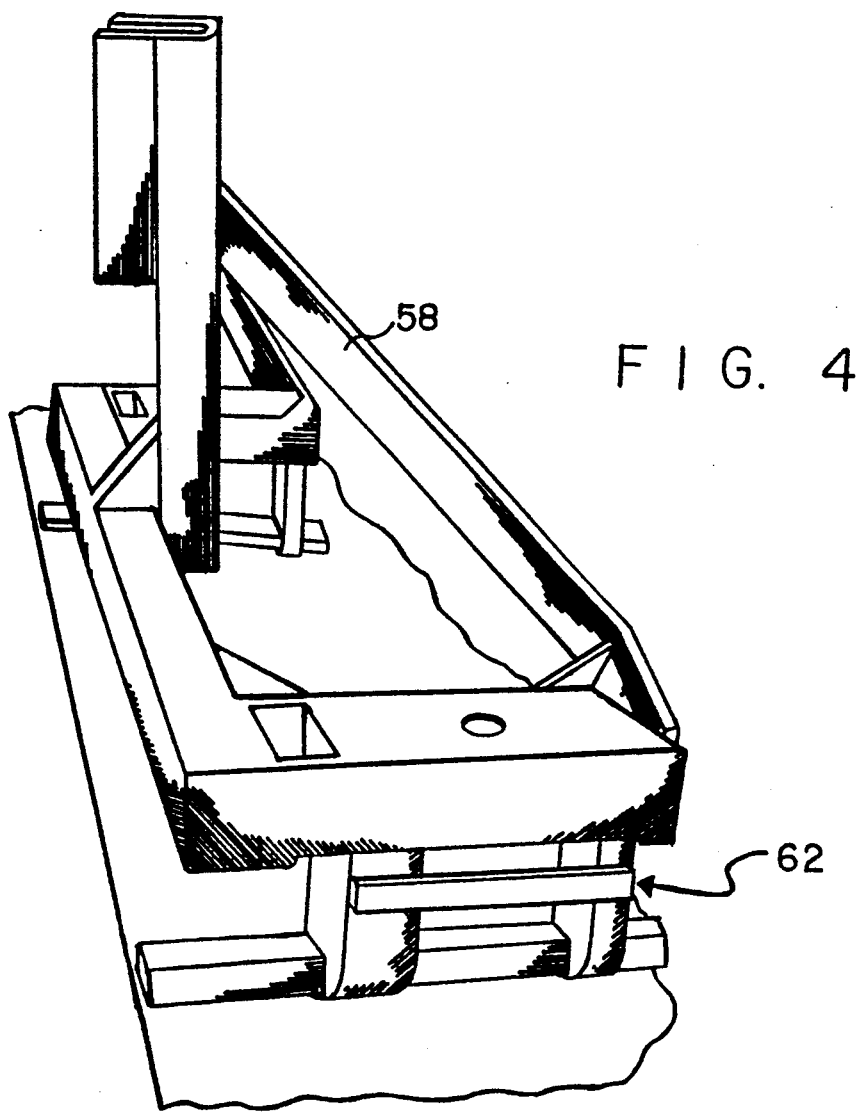
FIG. 4 is a perspective view of the A-frame bracket and H-links.
Figure 4A:
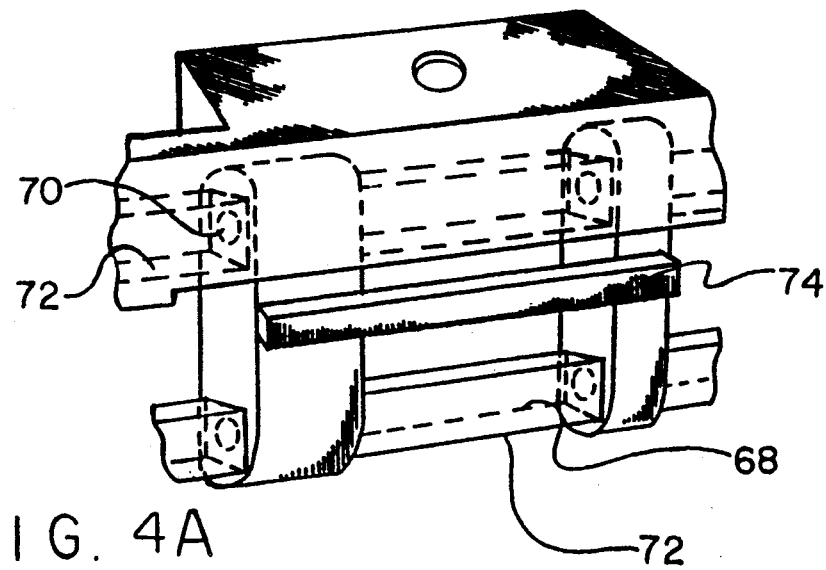
FIG. 4A is a perspective view of the H-link of FIG. 4 but shown it in an enlarged configuration.

Shown in FIGS. 1 through 5 are various views of the primary embodiment of the articulated lawn mower 10 constructed in accordance with the principles of the preferred embodiment of the present invention.

From an overview standpoint, the articulated lawn mower 10 is adapted to be coupled to a tractor for cutting the grass, whether of an even or uneven terrain. The tractor, not shown, may push or pull the mower 10 in a conventional manner. The mower has a first deck 12 with lateral edges 14 and 16 and a front end 18 and a rear end 20. The lawn mower 10 also has a second deck 24 which also has lateral edges 26 and 28 and a front end 30 and a rear end 32. The two decks 12 and 24 are laterally positioned adjacent to each other at their adjacent lateral edges 14 and 26.

A pivotal shaft 36 is used to couple the adjacent lateral edges 14 and 26 of the decks 12 and 24 in a side by side relationship. Beneath each deck 12 and 24 there are rotary cutting blades 38 secured to the lower surface of each deck through a rotatable disk 40. To effect rotation of the disk 40 and blades 38, a motor 44 and 46 on the upper surface of each deck 12 and 24 is secured to each rotary cutting disk and blades by a downwardly extending shaft 48.

Located adjacent to the back end of each of the decks 12 and 24 is an interior wheel 52 and an exterior wheel 54 mounted for independent rotation thereto. The interior wheels 52 are mounted adjacent to the pivotal shaft 36 and the exterior wheels 54 are mounted remote therefrom. The exterior wheels 54 are of a barrel shaped profile.

For coupling the articulated lawn mower 10 to a tractor, an A-frame mounting bracket 58 is employed. The A-frame mounting bracket 58 is coupled at its edges to the upper surface of each of the decks 12 and 24 adjacent to the front ends 18 and 30. To effect coupling the A-frame mounting bracket 58 to the decks, an H-link 62 pivotally couples each deck and a portion of the mounting bracket. Each of the H-links 62 is freely swingable in a vertical plane parallel with the front and rear ends.

When the interior wheels 52 are lowered through the cutting in a valley, the pivotal shaft 36 and adjacent edges 14 and 26 of the decks 12 and 24 move downwardly under the influence of gravity, and the lower portions 64 of the H-links 62 swing inwardly toward the pivot shaft 36. Note FIG. 5. When the interior wheels 52 are raised through the cutting of a raised ridge, the pivotal shaft 36 and adjacent edges 14 and 26 of the decks 12 and 24 move upwardly and the lower portions 64 of the H-links 62 swing inwardly toward the pivotal shaft. Note FIG. 5 again. To limit the amount of pivot experienced by the articulated decks 12 and 24, a limiting rod 80 is provided. The limiting rod 80 operates in association with an upstanding fixture 84 and 86 coupled to each deck 12 and 24 with the rod 80 pinned at the first end to one bracket 86 and slideably connected at its second end to the other fixture 84. The slideable connection in the second end of the rod is positionably received to limit the degree of pivoting. The articulating decks 12 and 24 are able to pivot with respect to each other about an axis defined by the pivot shaft 36 to thereby allow the rotary blades 36 to remain a uniform distance above the terrain for the even cutting of grass thereon.

More specifically, the lawn mower deck assembly comprises a pair of similarly shaped decks 12 and 24. The two decks 12 and 24 are in a side by side configuration. The decks 12 and 24 are essentially planar and adapted to be oriented horizontally, parallel with each other when cutting grass on even terrain. Each deck 12 and 24 has within it a rotary grass cutting disk 40 and blades 36 therebeneath. The decks 12 and 24 are coupled together at a shaft 36 about which the decks pivot about an axis coincident with the shaft 36. Arranging the decks 12 and 24 in a side by side configuration in a manner that allows the decks to articulate about a pivotal shaft 36 allows the planar surfaces of the decks to conform to valleys and ridges in the terrain being mowed. As the mower 10 is pulled over the terrain being cut, the mower flexes to maintain a uniform distance between the decks 12 and 24 and the ground. The terrain mowed with the articulating decks 12 and 24 results in a mowed grass of a uniform length.

The center pivotal shaft 36 connecting the two articulating mower decks 12 and 24 may lower or raise as determined by the contour of the ground being mowed. As the decks 12 and 24 articulate, the adjacent lateral edges 14 and 26 of the decks lower as the terrain forms into a valley and raise as the terrain forms a ridge. The center shaft 36 connects the adjacent decks 12 and 24 and thereby allows the decks to pivot with respect to each other. The center shaft 36 enables the decks 12 and 24 to articulate as required to closely follow variations in the terrain being mowed. Pivot means other than a pivot shaft 36 may be utilized. Consider for example ball and socket joints or a plurality of smaller hinges.

Forces generated by wheels 52 located at the back end 20 and 32 of each deck 12 and 24 cause the decks to articulate upwardly or downwardly to follow the contour of the terrain being mowed. The force transmitting wheels 52 are located at the interior of the each deck 12 and 24. The interior wheels 52 are adjacent to the pivotal shaft 36. Exterior wheels 54 are located remote from the pivotal shaft 36. The exterior wheels 54 have a generally cylindrical or barrel shaped profile to allow them to accommodate the angle of the ground and conform thereto. In the preferred embodiment, the exterior wheels 54 are simply empty liquid propane tanks rotatable about shafts. Forces are generated in the interior wheels 52 by variations in the terrain. Each deck 12 and 24 receives forces generated by the interior wheels 52 at the mounting points of the wheels. The forces imparted by the interior wheels 52 cause the decks 12 and 24 to raise or lower at the pivotal shaft 36. The raising and lowering ability of the decks 12 and 24 allows the individual decks to closely follow variations in the terrain. The exterior wheel's 54 cylindrical shaped profile follows the angle of the terrain as it forms a ridge or valley more effectively than a conventional wheel.

Each individual deck 12 and 24 has a rotary mower beneath it. The rotary mower is essentially a conventional rotary cutting disk 40 and blades 38 found in common lawn mowers. Located on the top center of each deck 12 and 24 is a motor 44 and 46. The motor 44 and 46 has a drive shaft 48 extending through the deck 12 and 24 to the rotary cutting disk 40 and blades 38. The rotary motor 44 and 46 has a chain link to a hydraulic motor. The motor 44 and 46, however, may be a straight mechanical motor as another source of power. Power for the hydraulic motor comes from a tractor through flexible lines therefrom. As the decks 12 and 24 articulate to follow the contour of the terrain being mowed, the rotary mowers are able to uniformly cut grass growing on non-uniform surfaces because the decks 12 and 24 pivot to follow the terrains's contours.

A shaft 90 couples the two motors 44 and 46. The shaft 90 has a connection 96 at one end to accommodate lifting and lowering as the decks 12 and 24 articulate. The interior of one shaft 92 moves with respect to the exterior of the other shaft 94 to allow the composite shaft 90 to change lengths as the decks 12 and 24 lower and raise due to variations in the terrain being mowed. As the articulating decks 12 and 24 pass over uneven terrain, the distance between the motors 44 and 46 located on top of each of the decks 12 and 24 increases or decreases due to pivoting at the pivotal shaft 36. The distance decreases as the decks 12 and 24 pass within a valley and the distance increases as the decks pass over a ridge. The shaft 90 allows the motors 44 and 46 to be connected even though the distance between them does not remain constant.

The only other device coupling the articulating decks 12 and 24 is a limiting member 80. In the preferred embodiment the limiting member 80 is formed of a rod. The rod 80 serves to limit the degree of pivot experienced by the decks 12 and 24 as they articulate. The limiting rod 80 comprises an upstanding bracket 82 and 84 coupled to the upper surface of each deck 12 and 24. The rod 80 is hinged to one bracket 82 and slideably secured to the second bracket 84. A clevis element in the rod 80 adjacent to the second bracket 84 and a pin 90 therein limits the degree of pivot. By limiting the degree of pivot experienced by the articulating decks 12 and 24, the amount of lowering or raising at the center pivot shaft 36 is thereby limited as the decks 12 and 24 pass through valleys and over ridges. A plurality of holes 88 along the rod 80 at the second bracket 84 allows a pin 90 to be placed at a predetermined location to thereby vary the degree of pivoting of the decks 12 and 24.

To couple the articulating decks 12 and 24 and the mounting bracket 58, H-links 62 are provided. The H-links 62 have upper ends 66 that are pivotally coupled to the mounting bracket 58. Additionally, the H-links 62 have lower ends 64 pivotally coupled to each deck 12 and 24. The H-link's 62 pivotal connections are secured to a common pin 68 and 70 at both their upper ends 66 and lower ends 64. Since the upper pin 70 is connected to the A-frame mounting bracket 58, the pin 70 is fixed for any one rotation. However, when the center pivot shaft 36 between the two articulating decks 12 and 24 raises or lowers with the contour of the terrain being mowed, the lower end 64 of the H-link 62 rotates together about the upper pin 70 to move the lower pin 68 in an arc toward or away from the center depending on the angling. Note FIG. 5. A fixed rod 74 is employed to couple the H-links 62 for concurrent movement. However, there is no necessity for a common pin 68 and 70 at the top 66 and bottom 64 of the H-link 62. Four bolts will provide the same functional results as a common pin 68 and 70. Alternatively, a ball and socket joint could be used in place of the pinned connections. The pivots 68 and 70 of the H-links 62 allow the deck 12 and 24 total latitude to raise and lower adjacent to the pivotal shaft 36 for cutting grass on any uneven terrain.

Fixed members 72 are provided to preclude axial movement by the H-links 62. The members 72 are formed of fixed bracketry parts positioned around the upper and lower H-link mounting pins 70 and 68 on either side and between the ends of the H-links 66 and 64. The bracketry 72 is shaped to prevent the ends of the H-links 64 and 66 from moving front to back along the mounting pins 68 and 70, but still allows the ends 64 and 66 to rotate about the pins 69 and 70 as the decks 12 and 24 are pulled or pushed over uneven terrain on which grass is being cut.

At the front end of the articulated lawn mower 10 is a three point connection 58. In the preferred embodiment the mounting bracket 58 is located at the front end 18 and 30 of each deck 12 and 24 to facilitate the lawn mower 10 being pulled by a tractor. The three point bracket 58 is essentially an A-frame bracket. The A-frame bracket 58 is secured permanently to the upper surface of the planar decks 12 and 24 by H-links 62. Furthermore, the A-frame bracket 58 is securable to a tractor to allow the articulating decks 12 and 24 to be pushed or pulled over terrain to be mowed.

The present disclosure includes that contained in the appended claims as well as that of the foregoing description. Although this invention has been described in its preferred form with a certain degree of particularity, it is understood that the present disclosure of the preferred embodiment has been made by way of example only and that numerous changes in the details of construction and the combination and arrangement of parts may be restored to without departing from the spirit and scope of the invention.

Now that the invention has been described, what is claimed is:

1. A lawn mower adapted to be coupled to a tractor for cutting the grass of an uneven terrain, comprising:
    a first deck having lateral edges at a front end and a rear end;
    a second deck having lateral edges at a front end and a rear end laterally positioned adjacent to the first deck at adjacent lateral edges;
    pivot means coupled to the adjacent lateral edges of the decks adapted to support the decks in side by side relationship in an essentially horizontal plane;
    rotary cutting means secured to the lower surface of each deck with a motor secured to each cutting means on the upper surface of each deck;
    an interior wheel and an exterior wheel located adjacent to one end of each of the decks, the exterior wheels having a barrel shaped profile;
    an A-frame mounting bracket coupled to the upper surface of each of the decks adjacent to the other end;
    link means pivotally coupling each deck and a portion of the mounting bracket, each link being freely swingable in a vertical plane parallel with the front and rear ends whereby when the interior wheels are lowered through the cutting in a valley, the pivot means and adjacent edges of the decks will move downwardly and the lower portions of the links will swing inwardly toward the pivot means;
    and a limiting means formed of an upstanding fixture coupled to each deck and a rod pinned at the first end to one bracket and slidable in the other fixture with positionable means received in the second end of the rod to limit the degree of pivoting.

2. A lawn mower deck assembly comprising:
    a pair of similarly shaped decks each with grass cutting means therebeneath, the decks being coupled together at a pivot axis;
    wheel means adjacent to the first end of each deck;
    a mounting bracket at the second end of each deck; and
    link means with upper and lower ends pivotally coupled at their upper ends to the mounting bracket and pivotally coupled at their lower ends to the deck for allowing the deck to raise and lower adjacent to the pivot axis for cutting grass on an uneven terrain.

3. The apparatus set forth in claim 2, wherein the wheel means at the first end of each deck comprises an interior wheel adjacent to the pivot axis and an exterior wheel remote therefrom.

4. The apparatus set forth in claim 3, wherein the exterior wheel has a generally cylindrically shaped profile.

5. The apparatus set forth in claim 2, and further including a limiting member comprising an upstanding bracket coupled to the upper surface of each deck and a rod hinged to one bracket and slideably secured to the other bracket with an element in the rod adjacent to the other bracket for limiting the degree of pivot.

* * * * *